Figure 1:
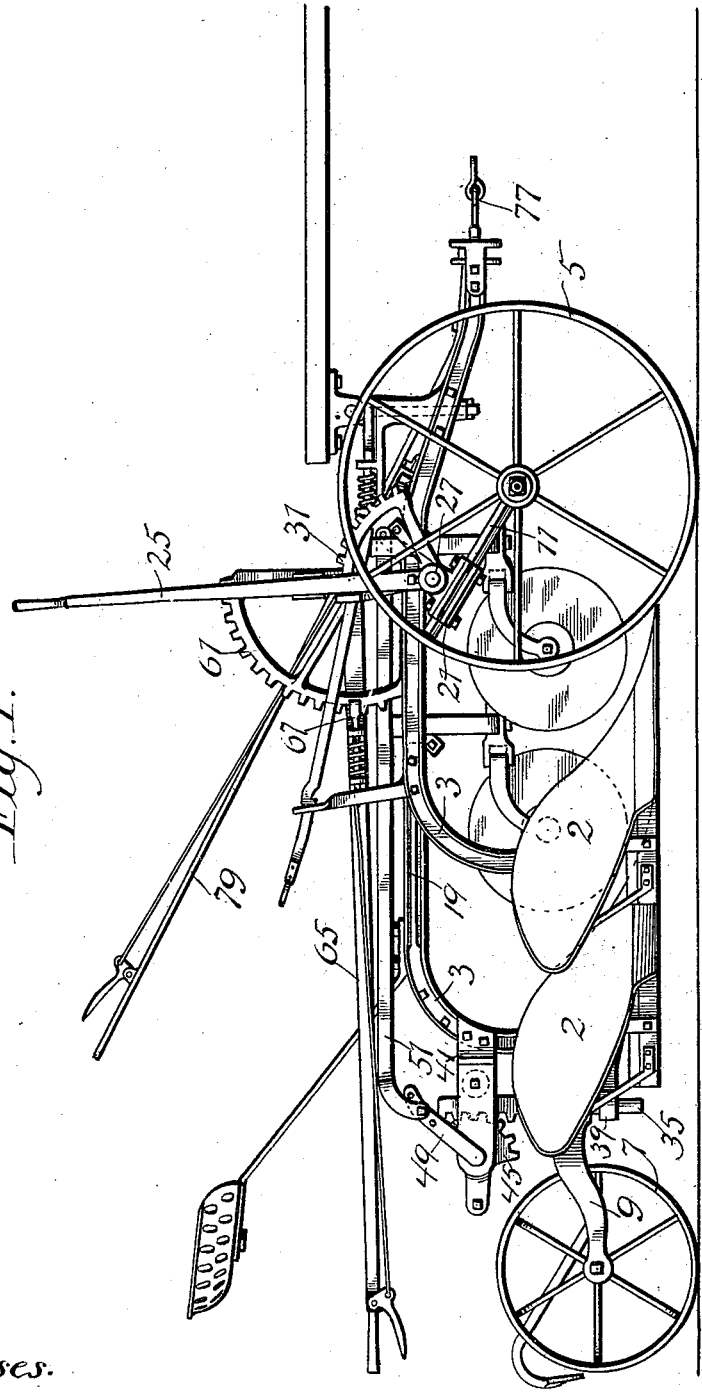

(No Model.) 4 Sheets—Sheet 1.

N. J. JOHNSON.
GANG PLOW.

No. 510,871. Patented Dec. 12, 1893.

Witnesses.
J. Jessen

Inventor
Nils J. Johnson.
By Paul Merwin att'ys.

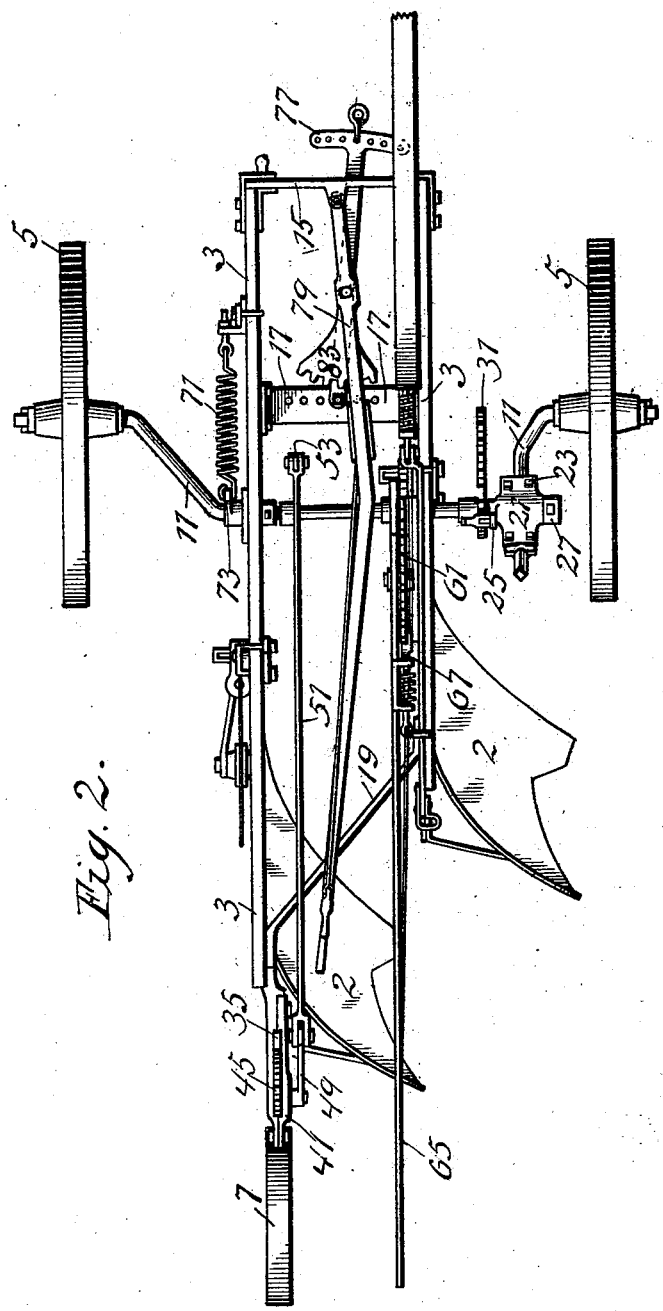

(No Model.)  
4 Sheets—Sheet 3.
N. J. JOHNSON.
GANG PLOW.
No. 510,871. Patented Dec. 12, 1893.
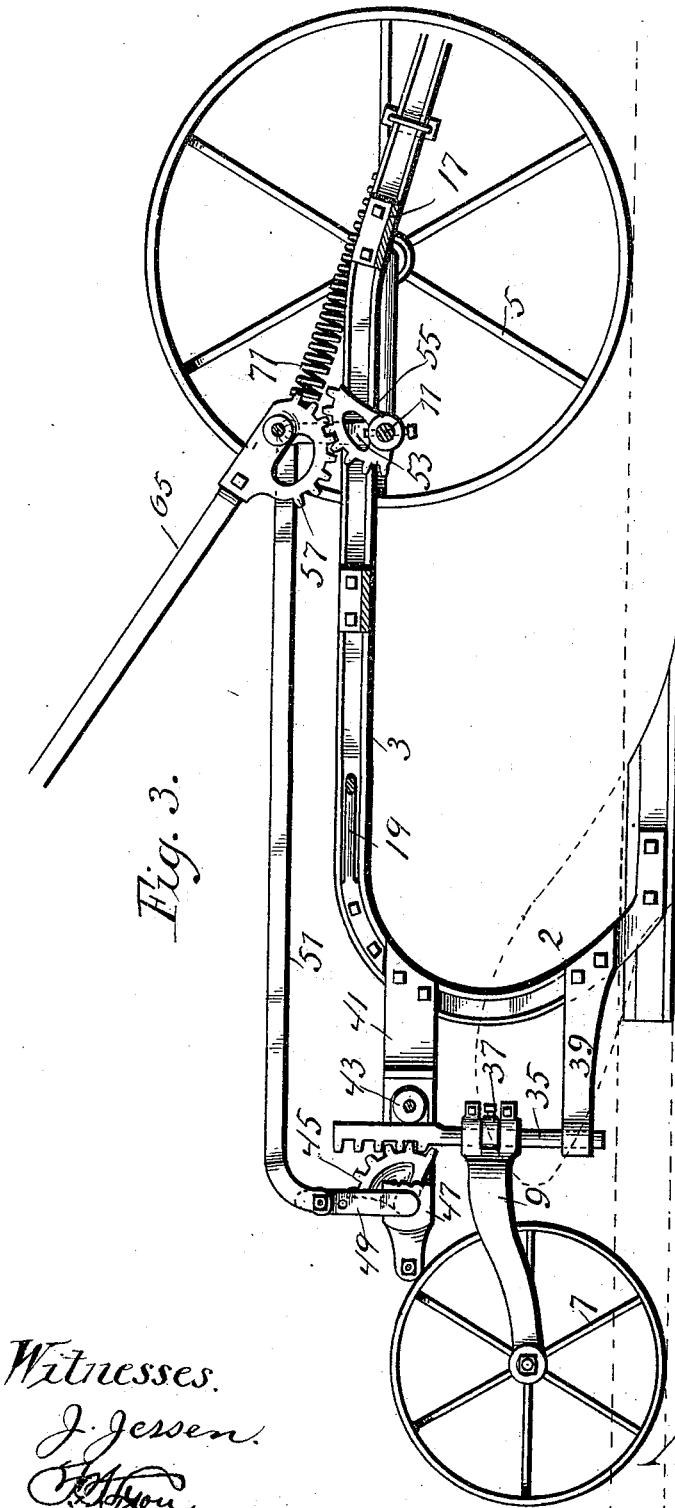
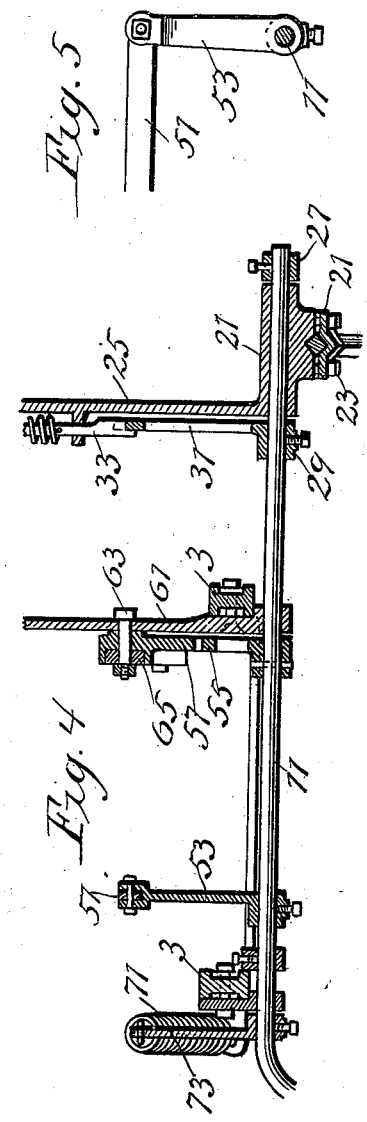
Witnesses  
J. Jessen
Inventor:  
Nils J. Johnson  
By Paul Synnerwin attys (No Model.) 4 Sheets—Sheet 4.
N. J. JOHNSON.
GANG PLOW.
No. 510,871. Patented Dec. 12, 1893.
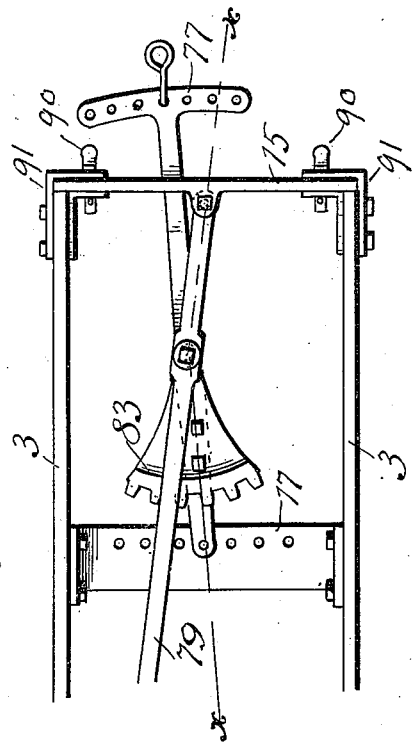
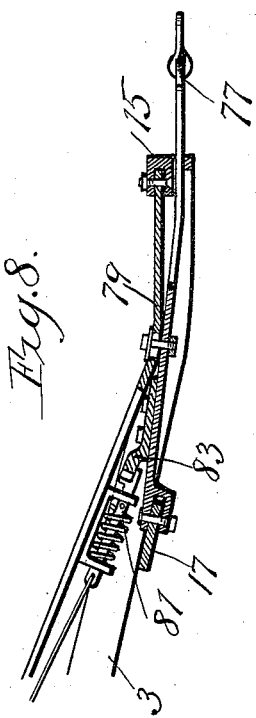
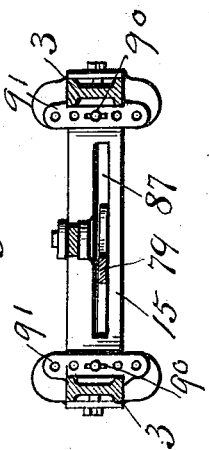
Witnesses
J. Jessen
F. A. Lyon
Inventor:
Nils J. Johnson
By Paul & Merwin Attys

UNITED STATES PATENT OFFICE.

NILS J. JOHNSON, OF MINNEAPOLIS, MINNESOTA, ASSIGNOR TO THE MINNEAPOLIS PLOW WORKS, OF SAME PLACE.

GANG-PLOW.

SPECIFICATION forming part of Letters Patent No. 510,871, dated December 12, 1893.

Application filed October 29, 1892. Serial No. 450,326. (No model.)

*To all whom it may concern:*

Be it known that I, NILS J. JOHNSON, of the city of Minneapolis, county of Hennepin, State of Minnesota, have invented a new and useful Gang-Plow, of which the following is a specification.

This invention relates to improvements in plows of the class usually known as gang plows and the objects are: first, to provide a device of this class with improved means for raising and lowering the plows; second, to provide improved means for adjusting the clevis or bridle; third, to provide a divided axle and an adjusting sleeve which may be used for adjusting the axle and thereby leveling the plow; fourth, to provide certain improvements in the details of construction which will be more readily understood from the detailed description taken in connection with the accompanying drawings, in which—

Figure 1 is a side elevation of a plow constructed in accordance with my invention. Fig. 2 is a plan view of the same. Fig. 3 is a side elevation of a portion of the plow showing more clearly the adjusting devices. Fig. 4 is a detail of the transverse shaft or axle showing the adjusting devices connected therewith. Fig. 5 is a detail showing the connection with the axle of the connecting rod that extends to the rear adjusting segment. Figs. 6, 7, and 8 are details showing the mechanism for adjusting the bridle.

In all of the figures of the drawings, 2—2 represent the plows which are of any preferred construction and are provided with the beams 3, also of any preferred construction. The plow is also provided with the usual side wheels 5 and with the rear wheel or caster 7, said caster being mounted in the yoke 9, which is capable of swiveling upon its support in the usual way. The wheels 5 are mounted upon the crank axle 11, said axle being mounted in bearings in the frame 13 which is composed of the plow beams together with the connecting bars or rods 15, 17 and 19. The axle 11 is divided into two parts, the short end thereof upon which the furrow wheel is mounted extending substantially at right angles to the main part of the axle and forming a crank therewith. This portion of the axle is mounted in the sleeve 21 that is secured upon the main part of the axle and is provided with the bolts 23 by means of which the parts of the sleeve may be loosened or clamped together, thus permitting the crank portion of the axle to be adjusted for the purpose of increasing or decreasing the length of the crank. This sleeve is also provided with the adjusting lever 25 and the sleeve is capable of turning freely on the axle, being held in position preferably at one end by the collar 27 and at the other end by the collar 29 carrying the quadrant 31. The lever 25 is provided with a spring catch 33 adapted to engage the quadrant 31 and keep it in any position to which it may be turned by said lever 25. This lever may be used where it is desired to quickly level the plow after the first furrow has been made and the wheel at this end of the axle is brought into the furrow in the position that it will occupy while plowing successive furrows. When it is desired, however, the crank portion of the axle may readily be adjusted by means of the sleeve already described. The plow beams 3 are pivotally connected to the axle 11, and these beams being connected by the braces and cross bars 15, 17, and 19 as before described, form a rigid frame that is pivotally supported upon said axle. The rear end of this frame is supported upon the yoke 9 of the caster 7 by means of the rod 35, having the series of teeth at its upper end. This rod passes through the caster yoke 9 and is secured thereto by the collar 37 that is secured upon the rod 35 and located in a fork of the caster yoke 9. This prevents any vertical movement of said rod in relation to said caster and at the same time permits the caster to turn freely upon said rod. A bar 39 extends backward from the curved plow beam to the lower end of the rod 35 and is provided with an opening through which said rod passes. One of the beams 3 is also provided with the backwardly extending plate 41 having the friction roller 43 that bears against the rod 35 opposite the series of teeth. A quadrant 45 is pivotally supported in bearings formed in the plate 41 and in the plate 47 secured thereto, said quadrant engaging the teeth upon the rod 35. The axle of this quadrant is provided with the crank arm 49, and a connecting rod 51 extends from said crank arm to the crank arm 53 secured upon the axle 11. The axle 11 is provided with the eccentric toothed segment 55 and a corresponding eccentric segment 57 is pivotally supported upon the quadrant 61 by means of the pivot bolt 63. Said segment is also provided with the handle 65 and as before stated, it engages the segment 55 upon the axle. The lever or handle 65 is provided with the locking dog 67 adapted to engage the teeth of said quadrant 61 for the purpose of locking said handle and its segment in any desired position. As the axle 11 is turned by means of the lever 65 and the segments hereinbefore described, the main part of the axle is necessarily moved up or down as the axle turns in the wheels. The purpose of the eccentric form of the segments is to provide a greater leverage in starting to raise the plow, and decreasing this leverage as the plows move upward. This movement of the axle will raise the points of the plows so as to cause them to stand above the lowest points of the wheels as shown in Fig. 1, and the corresponding movement of the segment 45 imparted to it through the crank arms and connecting rod 51 will cause the rear ends of the plow beams and with them the heels of the plows to move upward simultaneously with the points of the plows, thereby holding the plows in a substantially horizontal position as shown in Fig. 1, so that when the machine is being moved and the plows are not in use they can be raised so as to be entirely clear of the ground and the machine may be driven readily without any danger of catching the plows. I preferably provide a spring 71 connected to a crank arm 73 upon the axle 11 and connected also to one of the plow beams 3 at a point near its forward end. This spring aids in turning the axle when the plows are being raised. When the plows are lowered this spring is put under tension and it helps to turn the axle when it is desired to raise the plow. At the forward end of the frame formed by the ends of the plow beams and the cross bars 15, and 17, I provide the pivoted clevis-bar 77. This clevis-bar is pivotally connected to the cross bar 17, said cross bar being provided with a number of holes to any one of which said clevis-bar may be pivoted. The forward end of the clevis extends through a guide-slot 87 in the cross-bar 15 and in use the team may be hitched to this clevis-bar, and in the T-end of the bar I provide a number of holes in any one of which the clevis may be placed.

For the purpose of adjusting the bar 77 readily so as to cause the plow to cut more or less, I provide the lever 79 that is pivoted to the cross-bar 15 and to the clevis-bar 77 at a point about midway between its pivoted end and its free end. This lever extends back to a point near the driver's seat and is provided with a spring catch 81 adapted to engage a quadrant 83 secured upon said clevis-bar. By this means it will be seen that the clevis-bar may be readily and quickly adjusted and locked in any desired position and that this may be done while the team is in motion, as the draft is applied solely at the point where the clevis-bar is pivoted to the cross-bar 17 and there is nothing to prevent ready turning of the bar upon this pivot even when the plow is in use.

A further advantage lies in the vertical adjustability of the forward end of the clevis-bar, the adjustment being obtained by means of the removable pins 90 fastened to the ends of the cross-bar 15 and to the holes arranged one above the other in the blocks 91 secured to the ends of the plow-beam. The vertical adjustment of the forward ends of the clevis-bar in no way influences the convenient adjustment in the opposite direction by the lever 79 and the quadrant 83.

The plow is preferably provided with the usual rolling colters and other devices common to plows of this class which I have not particularly described as forming any part of my present invention.

The details of the device may be varied without departing from my invention.

Having thus described my invention, I claim as new and desire to secure by Letters Patent—

1. The combination with the crank axle 11, of the plow or plows having their beams connected to said axle, means for turning said axle, the caster frame and caster wheel, a rod provided with a rack bar supported thereon, a quadrant engaging said rack bar, and means for turning said quadrant simultaneously with the turning of said axle for the purpose of simultaneously raising the points and heels of the plow or plows.

2. The combination with the wheels and the crank axle 11, provided with the sector 55, of the sector 57 engaging therewith and provided with the operating handle 65, the plow beam or beams connected to said axle, the plow or plows supported on said beam or beams, the caster wheel and frame, the rod 35 connected to said caster frame and provided with the series of teeth, the toothed segment 45 supported upon the plate 41 secured to one of the plow beams, and provided with the crank arm 49, the crank arm 53 upon the axle and the rod 51 connecting said crank arms, substantially as described and for the purpose set forth.

3. The combination with the plow frame, of the adjustable clevis-bar pivoted at its rear end to said frame, and provided with the toothed segment 83, the lever 79 pivoted to said frame and pivoted to said clevis-bar at or near its central portion, and the latch secured upon said lever to engage said segment, for the purpose of locking the clevis-bar in any position to which it may be adjusted by said lever, substantially as described and for the purpose set forth.

4. The combination, with the wheels, of the crank axle, the plow or plows having their beams journaled upon said axle, means for turning the axle, an arm 53 secured upon the axle, the caster wheel, the brackets 41 and 39 extending from the plow-beam, the vertical rod 35 whereon the caster-wheel is secured, said rod having bearings in said brackets, means for adjusting said wheel upon said rod, and a connection between said arm 53 and the rod 35 whereby said axle and said rod are operated simultaneously, as and for the purpose set forth.

5. The combination, with the wheels, of the crank-axle, the plows having their beams journaled on said axle, means for turning said axle to raise and lower the plow beam or beams, an arm 53 provided upon said axle, the brackets 41 and 39 extending from the rear end of the plow-beam, the vertically movable rod 35 having bearings in said brackets, the caster-wheel having a yoke secured upon said rod, the upper part of said rod provided with a rack, said bracket 41 having a box, the quadrant gear 45 journaled in said box and adapted to engage the rack-rod 35, an arm 49 to move with said quadrant, a link or rod 51 pivotally connecting said arms 49 and 53 and the arm 49 being provided with several bolt-holes, whereby the throw of said arm may be regulated, substantially as and for the purpose specified.

6. The combination, with the plow-beam and the plow, of means for supporting the forward end of the plow-beam, the brackets 41 and 39 extending from the rear end of the beam, the rod 35 having the toothed upper end, said rod having bearings in said brackets, said bracket 41 provided with the box 47, an anti-friction roll 43 provided within said box to engage the back of the rod 35, means for rotating said quadrant, the caster-wheel 7, the yoke 9 thereof, and an adjustable collar 37 arranged upon the rod 35 and adapted to secure said yoke against vertical movement thereon, substantially as described and for the purpose set forth.

7. The combination, with the plow or plows, and the beam or beams thereof, of the wheels 5, the axle 11 whereon said beams are journaled, said axle being bent at one end to form a crank, the sleeve 21 journaled upon the opposite end of the axle 11, the box provided upon said sleeve 21, the short axle section whereon the other wheel 5 is secured and having an upwardly projecting polygonal end secured in said box of said sleeve, a quadrant fixed upon the main portion of the axle, and a lever having a lock to engage said quadrant and having its lower end secured upon the sleeve 21 whereby the short portion of the axle connected to said sleeve may be readily adjusted with respect to the main portion of the axle, substantially as and for the purpose set forth.

8. The combination, with the wheels 5, of the main crank portion of the axle whereon one wheel 5 is secured, the plows having their beams journaled on said main portion, the sleeve 21 journaled upon the inner end of said main portion and having both the adjusting lever 25 and the box, a quadrant secured upon said main portion to be engaged by said lever 25, the short section of the axle having the polygonal end adapted to be secured in said box and having the horizontal lower end whereon the other wheel 5 is secured, a sector gear secured upon said axle, a second gear meshing therewith and secured upon the plow frame or beam, a lever 65 connected with said second gear, the caster-wheel arranged to support the rear end of the plow or plows, and means connected therewith and with the main portion of the axle for raising the rear ends of the plows when the axle is turned to raise the points thereof, substantially as and for the purpose set forth.

9. The combination, of the wheels and the axle, with the plows and plow-beams, the cross bars 15 and 17, the former provided with a horizontal slot and the latter with a series of holes, the clevis-bar pivoted upon the bar 17 and projecting through the slot in said bar 15, the block 91 provided upon the ends of the plow-beams and having a series of pin-holes pins for securing the cross-bar 15 at the desired elevation in said block 91, and means for swinging and locking said clevis-bar, substantially as and for the purpose set forth.

In testimony whereof I have hereunto set my hand this 14th day of October, 1892.

NILS J. JOHNSON.

In presence of—
T. S. LYON,
C. G. HAWLEY.